United States Patent
Ozawa et al.

(10) Patent No.: US 8,830,529 B2
(45) Date of Patent: Sep. 9, 2014

(54) IMAGE PROCESSING DEVICE FOR ACCURATELY IDENTIFYING REGION IN IMAGE WITHOUT INCREASE IN MEMORY REQUIREMENT

(75) Inventors: Ryohei Ozawa, Nagoya (JP); Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 252 days.

(21) Appl. No.: 13/562,212

(22) Filed: Jul. 30, 2012

(65) Prior Publication Data
US 2013/0027732 A1  Jan. 31, 2013

(30) Foreign Application Priority Data
Jul. 29, 2011  (JP) .................................. 2011-167178

(51) Int. Cl.
| G06K 15/00 | (2006.01) |
| G06F 3/12 | (2006.01) |
| G06K 9/34 | (2006.01) |
| G06K 9/48 | (2006.01) |
| G06T 7/00 | (2006.01) |

(52) U.S. Cl.
CPC ..... *G06T 7/0048* (2013.01); *G06T 2207/10024* (2013.01); *G06T 7/0081* (2013.01); *G06T 2207/20076* (2013.01)
USPC ........... 358/2.1; 358/1.13; 382/164; 382/171; 382/173; 382/176; 382/199

(58) Field of Classification Search
None
See application file for complete search history.

(56) References Cited

U.S. PATENT DOCUMENTS

| 6,104,832 A | 8/2000 | Saito et al. |
| 6,731,801 B2 | 5/2004 | Murakawa et al. |

(Continued)

FOREIGN PATENT DOCUMENTS

| EP | 0516576 A2 | 12/1992 |
| EP | 1006717 A2 | 6/2000 |

(Continued)

OTHER PUBLICATIONS

Klink, Stefan et al., Rule-based Document Structure Understanding with a Fuzzy Combination of Layout and Textual Features, International Journal of Document Analysis and Recognition, Jan. 1, 2001, XP55015513, Retrieved from the Internet: URL:http://http://citeseerx.ist.psu.edu/viewdoc/download?doi=10.1.1.28..4808&rep=rep1&type=pdf [retrieved on Dec. 29, 2011].

(Continued)

Primary Examiner — Fan Zhang
(74) Attorney, Agent, or Firm — Baker Botts L.L.P.

(57) ABSTRACT

An image forming device performs functions including: dividing the image into a plurality of band images each including at least one sub-region; creating region data used to identify each sub-region included in the band image; updating the region data such that the region data identifies both first and second uniform sub-regions as a single uniform region of the image when the first uniform sub-region abuts the second uniform sub-region, the first and second uniform sub-regions being included in the first and second band image and classified as the uniform sub-region, respectively; and updating the region data such that the region data identifies both first and second nonuniform sub-regions as a single nonuniform region of the image when the first nonuniform sub-region abuts the second nonuniform sub-region, the first and second nonuniform sub-regions being included in the first and second band image and classified as the nonuniform sub-region, respectively.

12 Claims, 12 Drawing Sheets

(56) References Cited

U.S. PATENT DOCUMENTS

| | | |
|---|---|---|
| 7,343,046 B2 | 3/2008 | Curry et al. |
| 7,505,174 B2 | 3/2009 | Matsumoto et al. |
| 7,508,998 B2 | 3/2009 | Shiiyama |
| 7,606,419 B2 | 10/2009 | Koshi et al. |
| 7,773,776 B2 | 8/2010 | Adachi |
| 7,844,118 B1 | 11/2010 | Li et al. |
| 8,194,941 B2 | 6/2012 | Hara |
| 8,208,774 B2 | 6/2012 | Kudou et al. |
| 8,320,674 B2 | 11/2012 | Guillou et al. |
| 8,396,298 B2 | 3/2013 | Dai |
| 8,520,093 B2 | 8/2013 | Nanu et al. |
| 2004/0247204 A1 | 12/2004 | Lim et al. |
| 2005/0180645 A1 | 8/2005 | Hasegawa et al. |
| 2006/0039608 A1 | 2/2006 | Nishida |
| 2006/0115169 A1 | 6/2006 | Ohk |
| 2007/0236707 A1 | 10/2007 | Shoda |
| 2007/0286478 A1 | 12/2007 | Kishi |
| 2007/0286507 A1 | 12/2007 | Mori |
| 2008/0101698 A1 | 5/2008 | Yago |
| 2008/0122877 A1 | 5/2008 | Aoyama |
| 2009/0148039 A1 | 6/2009 | Chen et al. |
| 2009/0297024 A1 | 12/2009 | Dai |
| 2009/0310882 A1* | 12/2009 | Lin et al. ............ 382/268 |
| 2010/0142806 A1 | 6/2010 | Malik et al. |
| 2010/0142854 A1 | 6/2010 | Grunder |
| 2010/0260417 A1 | 10/2010 | Dai |
| 2010/0265549 A1 | 10/2010 | Kashibuchi et al. |
| 2010/0310170 A1 | 12/2010 | Li et al. |
| 2011/0158529 A1 | 6/2011 | Malik |
| 2011/0222762 A1 | 9/2011 | Matsuguma et al. |
| 2011/0252315 A1 | 10/2011 | Misawa et al. |
| 2012/0057795 A1 | 3/2012 | Konishi |
| 2013/0028518 A1 | 1/2013 | Ozawa et al. |
| 2013/0028520 A1 | 1/2013 | Kondo et al. |
| 2013/0028524 A1 | 1/2013 | Kondo et al. |
| 2013/0259365 A1 | 10/2013 | Suzuki et al. |

FOREIGN PATENT DOCUMENTS

| | | |
|---|---|---|
| JP | H05-081474 A | 4/1993 |
| JP | H05-166002 A | 7/1993 |
| JP | H05-225378 A | 9/1993 |
| JP | H06-056618 B2 | 7/1994 |
| JP | H06-208625 A | 7/1994 |
| JP | H09-114922 A | 5/1997 |
| JP | 2001-127999 A | 5/2001 |
| JP | 2002-176564 A | 6/2002 |
| JP | 2004-362541 A | 12/2004 |
| JP | 2006-085665 A | 3/2006 |
| JP | 2007-310775 A | 11/2007 |
| JP | 2007-336000 A | 12/2007 |
| JP | 2008-282095 A | 11/2008 |
| JP | 2009-123206 A | 6/2009 |
| WO | 2008/039365 A1 | 4/2008 |

OTHER PUBLICATIONS

European Patent Office, extended European Search Report for European Patent Application No. 12178341.9 (counterpart European patent application), dated Nov. 5, 2012.

United States Patent and Trademark Office, Non Final Rejection for U.S. Appl. No. 13/562,121 (related to above-captioned patent application), mailed Feb. 13, 2014.

Pietikainen, Matti et al., "Edge-Based Method for Text Detection from Complex Document Images", Document Analysis and Recognition, 2001, Proceedings, Sixth International Conference on Seattle, WA, USA, Sep. 10, 2001, pp. 286-291.

Zhong, Yu, et al., "Automatic Caption Localization in Compressed Video", IEEE Transactions on Pattern Analysis and Machine Intelligence, IEEE Service Center, Los Alamitos, CA, USA, vol. 22, No. 4, Apr. 1, 2000, pp. 385-392.

Cheng, Shyi-Chyi, et al., "Visual Object Retrieval Via Block-Based Visual-Pattern Matching", Pattern Recognition, Elsevier, GB, vol. 40, No. 6, Mar. 18, 2007, pp. 1695-1710.

Haneda, Eri, et al., "Text Segmentation for MRC Document Compression", IEEE Transactions on Image Processing, IEEE Service Center, Piscataway, NJ, USA, vol. 20, No. 6, Jun. 1, 2011, pp. 1611-1626.

European Patent Office, extended European Search Report for European Patent Application No. 12178346.8 (counterpart European Patent Application), mailed Nov. 12, 2012.

* cited by examiner

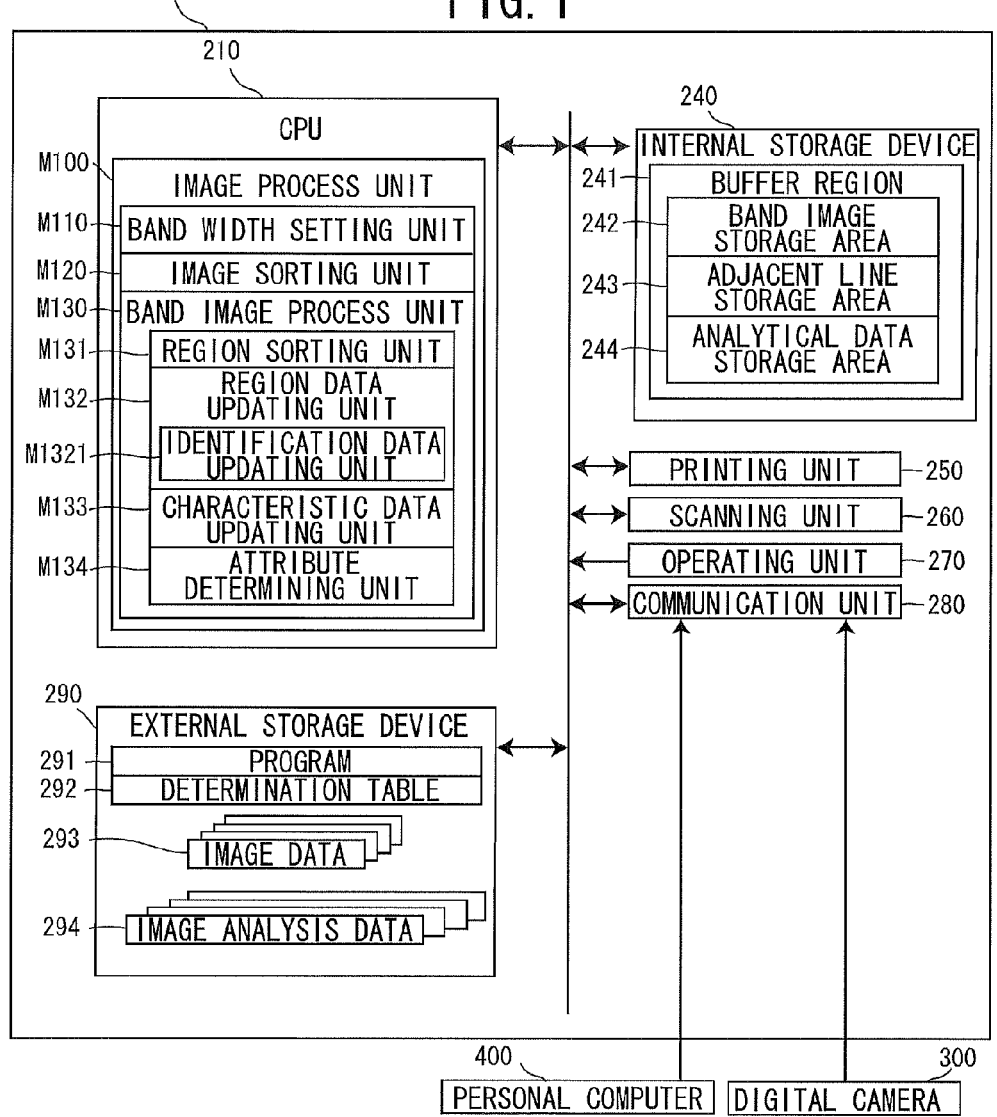

FIG. 3
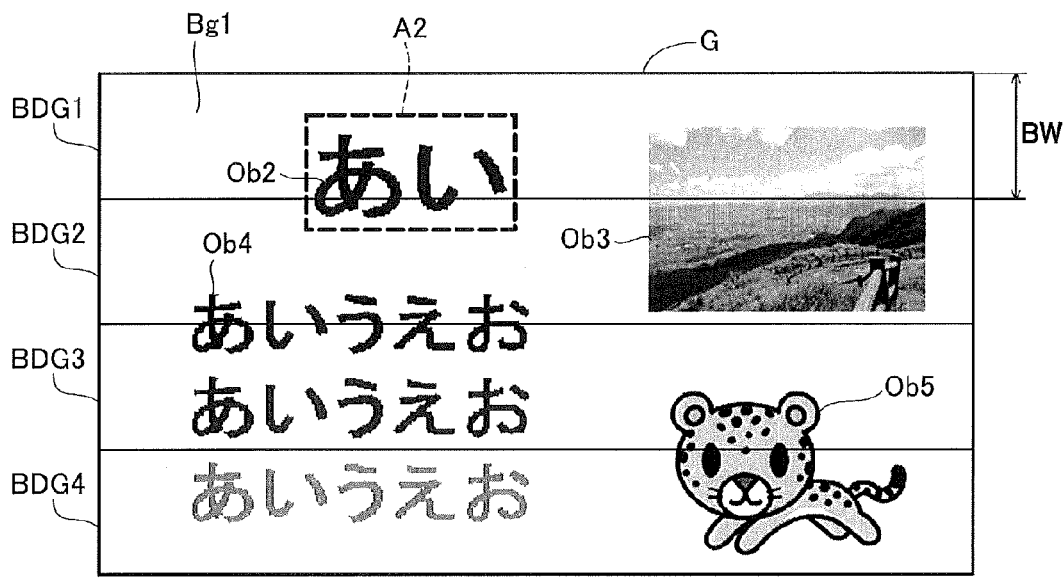
FIG. 4(A)
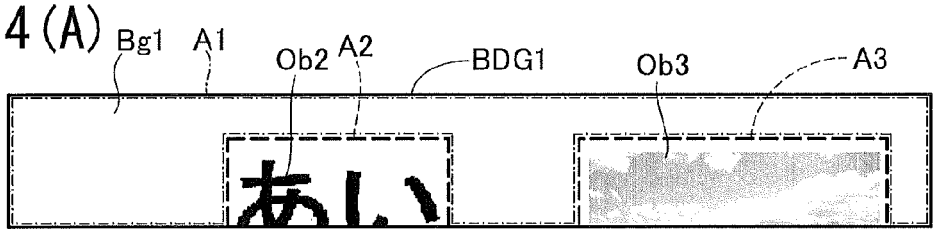
FIG. 4(B)
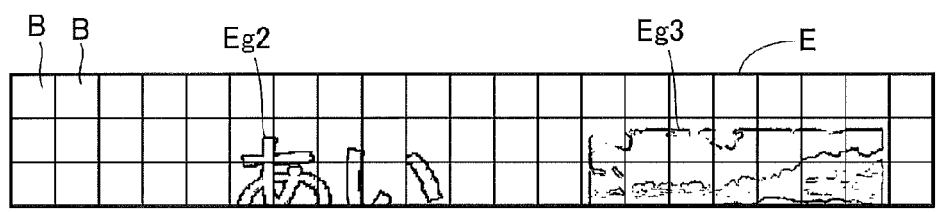
FIG. 4(C)

| IDENTIFIER | BLOCK COORDINATE | REGION TYPE | ATTRIBUTE | CHARACTERISTIC QUANTITY | BINARY DATA |
|---|---|---|---|---|---|
| 1 | (X, Y) = (X1, Y1)... | UNIFORM | | | |
| 2 | (X, Y) = (X2, Y2)... | NONUNIFORM | UNDETERMINED | Np (2) Nt (2) HD (2) | MG (2) |
| 3 | (X, Y) = (X3, Y3)... | NONUNIFORM | UNDETERMINED | Np (3) Nt (3) HD (3) | MG (3) |

FIG. 5(A)

| | | | | BA4 | BA5 | | | | | | | | BG2 | | | | BA6 | | |
|---|---|---|---|---|---|---|---|---|---|---|---|---|---|---|---|---|---|---|---|
|4|4|4|4|4|5|5|5|5|4|4|4|4|6|6|6|6|6|6|7| BA7
|4|4|4|4|4|4|4|4|4|4|4|4|4|6|6|6|6|6|6|7|
|4|4|8|8|8|8|8|8|8|8|4|4|6|6|6|6|6|6|6|7|

| | | | | | BA2 | | | | | | | | BG2 | | | | BA3 | | |
|---|---|---|---|---|---|---|---|---|---|---|---|---|---|---|---|---|---|---|---|
|1|1|1|1|1|2|2|2|2|1|1|1|1|3|3|3|3|3|3|1| BA1
|1|1|1|1|1|1|1|1|1|1|1|1|1|3|3|3|3|3|3|1|
|1|1|8|8|8|8|8|8|8|8|1|1|3|3|3|3|3|3|3|1|

| IDENTIFIER | BLOCK COORDINATE | REGION TYPE | ATTRIBUTE | CHARACTERISTIC QUANTITY | BINARY DATA |
|---|---|---|---|---|---|
| 1 | (X, Y) = (X1, Y1) ... | UNIFORM | / | / | / |
| 2 | (X, Y) = (X2, Y2) ... | NONUNIFORM | UNDETERMINED | Np(2) Nt(2) HD(2) | MG(2) |
| 3 | (X, Y) = (X3, Y3) ... | NONUNIFORM | UNDETERMINED | Np(3) Nt(3) HD(3) | MG(3) |
| 4 | (X, Y) = (X4, Y4) ... | UNIFORM | / | / | / |
| 5 | (X, Y) = (X5, Y5) ... | NONUNIFORM | UNDETERMINED | Np(5) Nt(5) HD(5) | MG(5) |
| 6 | (X, Y) = (X6, Y6) ... | NONUNIFORM | UNDETERMINED | Np(6) Nt(6) HD(6) | MG(6) |
| 7 | (X, Y) = (X7, Y7) ... | UNIFORM | / | / | / |
| 8 | (X, Y) = (X8, Y8) ... | NONUNIFORM | UNDETERMINED | Np(8) Nt(8) HD(8) | MG(8) |

FIG. 6 (B)

| IDENTIFIER | BLOCK COORDINATE | REGION TYPE | ATTRIBUTE | CHARACTERISTIC QUANTITY | BINARY DATA |
|---|---|---|---|---|---|
| 1 | (X, Y) = (X1, Y1) ... (X4, Y4) ... (X7, Y7) ... | UNIFORM | / | / | / |
| 2 | (X, Y) = (X2, Y2) ... (X5, Y5) ... | NONUNIFORM | TEXT DRAWING | / | MG(2+5) |
| 3 | (X, Y) = (X3, Y3) ... (X6, Y6) ... | NONUNIFORM | UNDETERMINED | Np(3+6) Nt(3+6) HD(3+6) | MG(3+6) |
| 8 | (X, Y) = (X8, Y8) ... | NONUNIFORM | UNDETERMINED | Np(8) Nt(8) HD(8) | MG(8) |

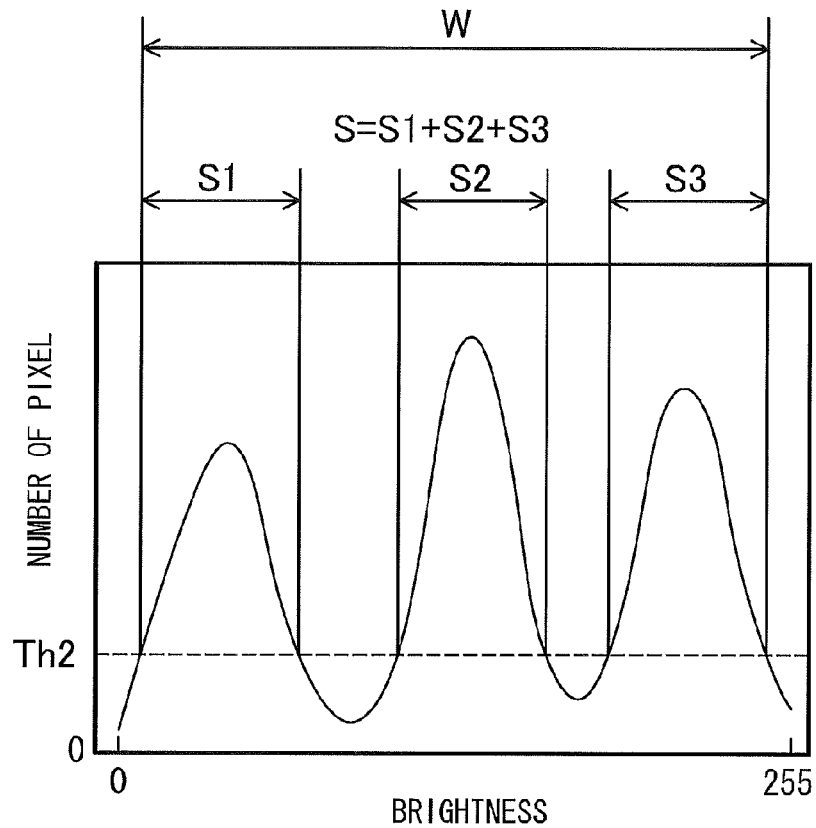

IMAGE PROCESSING DEVICE FOR ACCURATELY IDENTIFYING REGION IN IMAGE WITHOUT INCREASE IN MEMORY REQUIREMENT

CROSS REFERENCE TO RELATED APPLICATION

This application claims priority from Japanese Patent Application No. 2011-167178 filed Jul. 29, 2011. The entire content of the priority application is incorporated herein by reference.

TECHNICAL FIELD

The present invention relates to an image processing device, a non-transitory computer-readable storage medium, and a method for determining an attribute of an image.

BACKGROUND

There are techniques known in the art for identifying the characteristics of target regions (object regions within a target region, for example) based on image data representing the original image. By correctly identifying characteristics of a target region, an image processor can perform image processing suited to these characteristics. According to one technology known in the art for identifying characteristics of original images, an image processor converts original image data (600 dpi, for example) to image data at a lower resolution (300 dpi, for example) in order to conserve memory space. Subsequently, the image processor identifies characteristics of original images using the low-resolution image data.

SUMMARY

However, there are some occasions when using low-resolution image data does not provide sufficient information to identify object regions with accuracy.

In view of the foregoing, it is an object of the present invention to provide a technology for accurately identifying regions in an original image without increasing memory requirements excessively.

In order to attain the above and other objects, the invention provides an image processing device including a processor; and a memory storing computer readable instructions therein, when executed by the processor, causing the image processing device to perform: preparing image data representing an image including a plurality of regions; dividing the image into a plurality of band images each including at least one sub-region, the plurality of band images including a first band image and a second band image adjacent to the first band image; classifying each of the at least one sub-region included in the band image as one of an uniform sub-region and a nonuniform sub-region other than the uniform sub-region; creating region data used to identify each of the at least one sub-region included in the band image; updating the region data such that the region data identifies both a first uniform sub-region and a second uniform sub-region as a single uniform region of the image when the first uniform sub-region abuts the second uniform sub-region, the first uniform sub-region being included in the first band image and classified as the uniform sub-region, the second uniform sub-region being included in the second band image and classified as the uniform sub-region; and updating the region data such that the region data identifies both a first nonuniform sub-region and a second nonuniform sub-region as a single nonuniform region of the image when the the first nonuniform sub-region abuts the second nonuniform sub-region, the first nonuniform sub-region being included in the first band image and classified as the nonuniform sub-region, the second nonuniform sub-region being included in the second band image and classified as the nonuniform sub-region.

According to another aspect, the present invention provides a non-transitory computer-readable storage medium storing computer-readable instructions that, when executed by a processor, causes an image processing device to perform: preparing image data representing an image including a plurality of regions; dividing the image into a plurality of band images each including at least one sub-region, the plurality of band images including a first band image and a second band image adjacent to the first band image; classifying each of the at least one sub-region included in the band image as one of an uniform sub-region and a nonuniform sub-region other than the uniform sub-region; creating region data used to identify each of the at least one sub-region included in the band image; updating the region data such that the region data identifies both a first uniform sub-region and a second uniform sub-region as a single uniform region of the image when the first uniform sub-region abuts the second uniform sub-region, the first uniform sub-region being included in the first band image and classified as the uniform sub-region, the second uniform sub-region being included in the second band image and classified as the uniform sub-region; and updating the region data such that the region data identifies both a first nonuniform sub-region and a second nonuniform sub-region as a single nonuniform region of the image when the first nonuniform sub-region abuts the second nonuniform sub-region, the first nonuniform sub-region being included in the first band image and classified as the nonuniform sub-region, the second nonuniform sub-region being included in the second band image and classified as the nonuniform sub-region.

According to another aspect, the present invention provides a method for controlling an image processing device. The method includes: preparing image data representing an image including a plurality of regions; dividing the image into a plurality of band images each including at least one sub-region, the plurality of band images including a first band image and a second band image adjacent to the first band image; classifying each of the at least one sub-region included in the band image as one of an uniform sub-region and a nonuniform sub-region other than the uniform sub-region; creating region data used to identify each of the at least one sub-region included in the band image; updating the region data such that the region data identifies both a first uniform sub-region and a second uniform sub-region as a single uniform region of the image when the first uniform sub-region abuts the second uniform sub-region, the first uniform sub-region being included in the first band image and classified as the uniform sub-region, the second uniform sub-region being included in the second band image and classified as the uniform sub-region; and updating the region data such that the region data identifies both a first nonuniform sub-region and a second nonuniform sub-region as a single nonuniform region of the image when the first nonuniform sub-region abuts the second nonuniform sub-region, the first nonuniform sub-region being included in the first band image and classified as the nonuniform sub-region, the second nonuniform sub-region being included in the second band image and classified as the nonuniform sub-region.

BRIEF DESCRIPTION OF THE DRAWINGS

In the drawings:

FIG. 1 is a block diagram showing a multifunction peripheral according to an embodiment of an invention;

FIG. 3 is an explanatory diagram showing an example of an original image;

FIG. 5(A) is an explanatory diagram showing an example of a block image of a second band image prior to a region consolidation process;

FIG. 5(B) is an explanatory diagram showing a block image to which the block image of FIG. 5(A) is updated after the region consolidation process is executed;

FIG. 5(C) is an explanatory diagram showing an example of a set of line data prior to the region consolidation process;

FIG. 5(D) is an explanatory diagram showing a set of line data to which the set of line data of FIG. 5(C) is updated after the region consolidation process is executed;

FIG. 6(A) is a table showing an example of the image analysis data of two band images prior to the region consolidation process;

FIG. 6(B) is a table showing image analysis data to which the image analysis data of FIG. 6(A) is updated when an attribute od a region "2" is identified after the region consolidation process is executed;

FIG. 8(A) is a histogram representing brightness distribution;

FIG. 8(B) is a table representing relationships between distribution width, color numbers, pixel density, and the attribute of region;

DETAILED DESCRIPTION

Figure 2A:
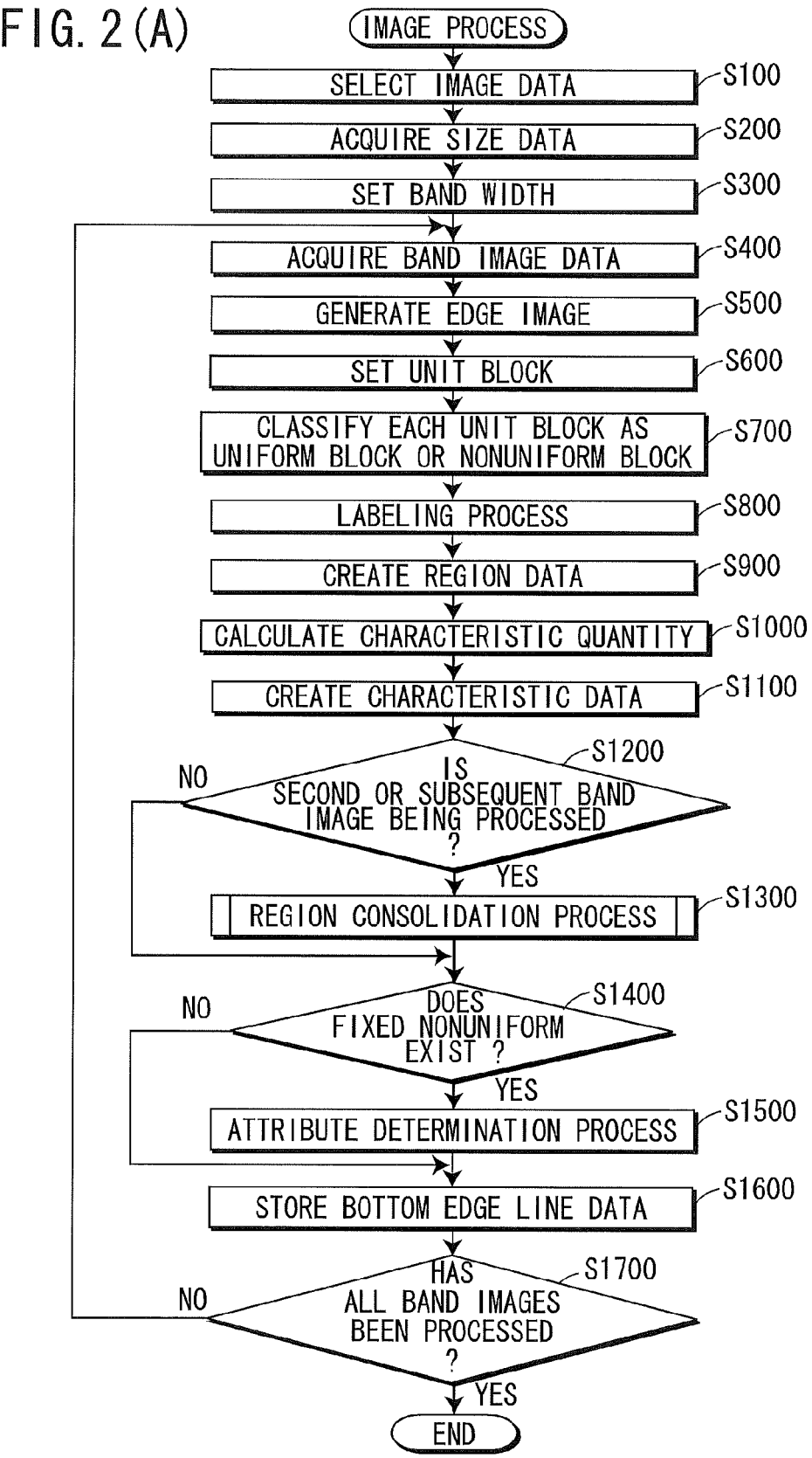
FIGS. 2(A) and 2(B) are flowchart illustrating steps in an image process executed by the multifunction peripheral.

Next, an embodiment of the invention will be described while referring to FIGS. 1-10. FIG. 1 is a block diagram showing a multifunction peripheral 200 serving as a first embodiment of the invention. The multifunction peripheral 200 includes a CPU 210; an internal storage device 240 having ROM and RAM; a printing unit 250 for printing images using a prescribed system; a scanning unit 260 for reading an original using a photoelectric converting element; an operating unit 270, such as a touch panel; a communication unit 280 for communicating and exchanging data with an external device, such as a digital camera 300 or a personal computer 400; and an external storage device 290, such as a hard disk drive or EEPROM.

The internal storage device 240 is provided with a buffer region 241. The buffer region 241 further includes a band image storage area 242, an adjacent line storage area 243, and an analytical data storage area 244. The band image storage area 242 serves to store band image data representing a plurality of band images produced by dividing an original image. The adjacent line storage area 243 serves to store identifier data for one line worth of pixels for each of the top edge and bottom edge of band images. The analytical data storage area 244 stores image analysis data 294 generated in an image process according to the embodiment.

The external storage device 290 stores various computer programs 291 for controlling the multifunction peripheral 200, a determination table 292 referenced in an image process described later, and image data 293 that is subjected to the image process. The external storage device 290 can also store the image analysis data 294 generated in the image process. The computer programs 291 may be supplied on a recording medium in a format that can be read by a computer. The recording medium may be a removable recording medium, an internal storage device built into the computer, or an external storage device that is connected to the computer. The image data 293 may include image data generated by the scanning unit 260 when scanning an original or may be image data acquired from one of the external devices 300 or 400 via the communication unit 280.

By executing the computer programs 291, the CPU 210 functions as an image process unit M100 for executing an image process described later. The image process unit M100 includes a band width setting unit M110, an image dividing unit M120, and a band image process unit M130. The band image process unit M130 further includes a region sorting unit M131, a region data updating unit M132, a characteristic data updating unit M133, and an attribute determining unit M134. The region data updating unit M132 also includes an identification data updating unit M1321. The processes executed by these process units will be described next in greater detail.

The image process unit M100 executes an image process on image data to determine the content of an image represented by the image data. FIG. 2 is a flowchart illustrating steps in the image process.

In S100 at the beginning of the image process in FIG. 2, the image process unit M100 selects the image data to be subjected to the image process (original image data). In other words, the image process unit M100 prepares the image data. For example, the image process unit M100 may receive an instruction from the user via the operating unit 270 indicating the original image data and may select the specified original image data from the image data 293 stored in the external storage device 290, where the image data 293 is data representing a plurality of images.

FIG. 3 shows an example of an original image G represented by the original image data. The original image G includes a background image Bg1, a first text object Ob2 and a second text object Ob4 representing text including at least one letter, a photograph object Ob3 representing a photograph, and a drawn object Ob5 representing a drawing. A "drawing" in this embodiment includes an illustration, table, diagram, pattern, and the like. The original image data in the following description will be bitmap data configured of RGB pixel data.

In S200 the band width setting unit M110 acquires size data based on the original image data. The size data acquired in the embodiment includes a character size CS representing the size of characters included in text objects in the original image G, and a resolution R of the original image G. The character size CS may indicate the size of the largest characters among all characters in the text objects, for example. The character size CS is expressed in units of points (pt; equivalent to 1/72 inches), for example. The resolution R is expressed in units of dots per inch (dpi), for example, and may be considered size data representing the size of a single pixel. This size data may be associated with the original image data (more specifically, included in the header) or may be inputted by the user via the operating unit 270.

In S300 the band width setting unit M110 sets a band width BW using the character size CS and resolution R, where the band width BW is expressed by the equation BW=CS×R×k. Here, the coefficient k is a designed value. The band width BW is expressed in numbers of pixels.

In S400 the image dividing unit M120 sequentially acquires band image data from the original image data representing the original image G. The band image data includes raster lines of the number indicated by the band width BW. Consequently, the image dividing unit M120 divides the original image G into a plurality of band images BDG1-BDG4, as shown in FIG. 3, and the image process unit M100 selects one of the plurality of band images BDG1-BDG4 sequentially and performs the process described below in S500-S1400 on unit band images. The band image data representing band images that the image dividing unit M120 sequentially acquires in S400 is stored in the band image storage area 242.

FIGS. 4(A)-(D) are explanatory diagrams illustrating the image process performed for a single band image. The process target in the example of FIG. 4(A)-(D) is the band image BDG1 (FIG. 4(A)) that includes the upper edge portion of the original image G. As shown in FIG. 4(A), the band image BDG1 includes the top portion of the first text object Ob2 and the top portion of the photograph object Ob3.

In S500 the region sorting unit M131 creates edge image data representing an edge image using the band image data currently being processed. FIG. 4(B) shows an edge image E based on the band image BDG1. The edge image E includes an edge object Eg2 corresponding to the first text object Ob2 in the band image BDG1, and an edge object Eg3 corresponding to the photograph object Ob3. The edge image data is obtained by applying the Sobel filter to each component value in data for a plurality of RGB pixels constituting the band image data. The edge image data is configured of pixel data for the plurality of pixels constituting the original image. The pixel data for one pixel includes R, G, and B component values. Each of R, G, B component values of one pixel in the edge image data expresses an edge strength of the corresponding pixel in the original image for the corresponding color component. Note that the edge image E may be created using any of various edge detection filters, such as the Prewitt filter and Roberts filter, and is not limited to the Sobel filter.

In S600 of FIG. 2(A), the region sorting unit 131 configures a plurality of unit blocks B for the edge image E. The unit blocks B are arranged as a grid in relation to the edge image E. Since the edge image E and the band image BDG1 are identical in size (have the same number of pixels both vertically and horizontally), it is also possible to say that the unit blocks B are set for the band image BDG1. A single unit block B is equivalent to the size of N×N unit pixels (where N is a predetermined natural number), a unit pixel being one pixel of the edge image E (the band image BDG1), for example. As will be described later, the unit block B is the smallest unit area in the original image that can be identified in the image process. N is any designed value, but smaller than a band width BW of the band image BDG1. The region sorting unit 131 sets a block image BG1 corresponding to the configuration of unit blocks B in S600.

The block image BG1 is configured of block pixels BP corresponding to the plurality of unit blocks B described above. The value of each pixel in the block image BG1 is used to represent various information related to the corresponding unit block B (such as region identification data described later). When configuring the block image BG1, the region sorting unit 131 initializes the value of all block pixels BP to "0".

In S700 the region sorting unit M131 classifies each of the unit blocks B as either a uniform block or a nonuniform block. For example, the region sorting unit M131 calculates an edge strength for each unit block B (region edge strength). Specifically, the region sorting unit M131 calculates the average values (ERave, EGave, and EBave) of component values (R, G, and B) for all pixels of the edge image included in the unit block B as a characteristic value indicating the region edge strength. The region sorting unit M131 classifies the unit blocks B as either uniform or nonuniform blocks by comparing the region edge strength of each unit block B to a predetermined reference. A "uniform block" is a unit block in which the region edge strength is less than the prescribed reference, while the nonuniform block is a unit block in which the region edge strength is greater than or equal to the predetermined reference. For example, the region sorting unit M131 compares the average values ERave, EGave, and EBave indicating the region edge strength to reference values ETr, ETg, and ETb preset for each of these values. If ERave<ETr, EGave<ETg, and EBave<ETb, the region sorting unit M131 classifies the unit block B being processed as a uniform block. Conversely, if even one of ERave≥ETr, EGave≥ETg, and EBave≥ETb is satisfied, the region sorting unit M131 classifies the target unit block B as a nonuniform block.

In S800 the region sorting unit M131 executes a labeling process to sort all of the unit blocks B into a plurality of groups and to assign a region identifier to each group. In other words, the region sorting unit M131 assigns each pixel included in same region with a same identifier identifying the same region. FIG. 4(C) shows an example of the block image) BG1 following the labeling process. The region sorting unit M131 groups together pluralities of contiguous block pixels BP in the block image BG1 corresponding to unit blocks B classified as nonuniform blocks, and groups together pluralities of contiguous block pixels BP corresponding to unit blocks B classified as uniform blocks.

Next, the region sorting unit M131 updates the value of each block pixel BP so that block pixels BP belonging to the same group have the same value and block pixels BP belonging to different groups have different values. This process results in identifying image regions of the block image BG1 configured of block pixels BP having the same pixel value. In other words, the region sorting unit M131 classifies each of at least one sub-region included in the selected band image as one of an uniform sub-region and a nonuniform sub-region.

In the example shown in FIG. 4(C), three image regions (sub-region) BA1-BA3 have been identified in the block image BG1. That is, the image regions identified in the block image BG1 are the image region BA1 having pixel value "1", the image region BA2 having pixel value "2", and the image region BA3 having pixel value "3". Image regions A1-A3 (FIG. 4(A)) are identified in the band image BDG1 as regions whose smallest unit is the unit block B that correspond to the image regions BA1-BA3 identified in the block image BG1. As described above, pixel values in the block image BG1 following the labeling process are region identifiers assigned to each unit block B for identifying the image regions A1-A3 in the band image BDG1.

Here, the definition of "identifying" an image region is not restricted to the final identification of an image region in the original image G, but includes temporary identifications of image regions during the course of processing a unit band image. Hence, in the embodiment, identification results for image regions are updated by updating region data (included in the image analysis data 294 described later) representing identification results of image regions, as will be described later. Hereinafter, when it is determined that region data for a specific image region will not be updated, the corresponding image region will be referred to as a "conclusively identified image region" or a "fixed image region."

The image regions A1-A3 identified in the band image BDG1 are either nonuniform or uniform regions. A nonuniform region is configured of unit blocks B classified as nonuniform blocks, while a uniform region is configured of unit blocks B classified as uniform blocks. In the example of FIG. 4(A), the image region A1 is a uniform region, while the image regions A2 and A3 are nonuniform regions.

Of the image regions within the band image BDG1 in the example of FIG. 4(A), the image region A2 is identified as a region corresponding to the top portion of the first text object Ob2, the image region A3 is identified as a region corresponding to the top portion of the photograph object Ob3, and the image region A1 is identified as a region excluding the image regions A2 and A3 (corresponding to the top portion of the background image Bg1).

In S900 the band image process unit M130 creates region data representing the results of identifying regions in the band image BDG1. The created region data is used to identify each region. In the embodiment, the band image process unit M130 stores this region data in the image analysis data 294. FIG. 4(D) shows an example of the image analysis data 294. Items recorded in the image analysis data 294 include region identifiers identifying specific regions, block coordinates configured of coordinates for the plurality of unit blocks B (block pixels BP) constituting each region, region types indicating either a nonuniform region or a uniform region, region attributes, characteristic quantities, and binary data. Of these items, the region identifiers identifying regions and the block coordinates correspond to the region data. In the example of FIG. 4(D), region identifiers "1", "2", and "3" for the image regions A1-A3 identified in the band image BDG1 (FIG. 4(A)), and block coordinates for the unit blocks B constituting the image regions A1-A3 are recorded in the image analysis data 294.

In S1000 the band image process unit M130 calculates characteristic quantities for the image regions A2 and A3, which are the nonuniform regions identified in the band image BDG1. More specifically, the band image process unit M130 generates binary image data MG(2) and MG(3) by thresholding the image regions A2 and A3. Here, "thresholding" denotes sorting each of pixels included in a region into object pixel or background pixel. For example, the band image process unit M130 classifies each of pixels contained in the image regions A2 and A3 as background pixels when the pixel whose color difference from pixels in the neighboring uniform image region A1 is smaller than a prescribed reference. The region sorting unit M131 then sets, as object pixels, remaining pixels contained in the image regions A2 and A3 other than pixels classified as background pixels.

Next, the band image process unit M130 generates characteristic quantities including the object pixel count Np, the total pixel count Nt, and histogram data HD representing the distribution of brightness values in the object pixels. Hereinafter, the object pixel count Np, total pixel count Nt, and histogram data HD for an image region whose region identifier is "i" will be expressed as Np(i), Nt(i), and HD(i).

In S1100 the band image process unit M130 creates characteristic data describing the characteristic quantities Np, Nt, and HD and the binary image data MG. In the embodiment, the band image process unit M130 stores the characteristic data in the image analysis data 294. In the example of FIG. 4(D), characteristic quantities Np(2), Nt(2), and HD(2) and characteristic quantities Np(3), Nt(3), and HD(3) are recorded in the characteristic quantities column of the image analysis data 294 and binary image data MG(2) and MG(3) for the image regions A2 and A3 (FIG. 4(A)) are recorded in the binary image data column of the image analysis data 294.

In S1200 the band image process unit M130 determines whether or not the band image currently being processed is the second or subsequent band image. Since the band image BDG1 is the first band image in the original image G, the band image process unit M130 determines that the current band image is not the second or subsequent band image when the band image BDG1 is the process target. However, when the band images BDG2-BDG4 (FIG. 3) are the process target, the band image process unit M130 determines that the current band image is the second or subsequent band image.

When determining that the current band image is the second or subsequent band image (S1200: YES), in S1300 the region data updating unit M132 and characteristic data updating unit M133 execute a region consolidation process. The region consolidation process is performed to join image regions identified in the current band image with image regions identified in the previously processed band image. The region consolidation process will be described later. When the current band image is not the second or subsequent band image (S1200: NO), the band image process unit M130 skips S1300 and advances directly to S1400.

In S1400 the band image process unit M130 determines whether or not a fixed nonuniform region exists. Here, a "fixed nonuniform region" indicates a nonuniform region whose region data in the image analysis data 294 is fixed and will no longer be updated. The band image process unit M130 determines that a nonuniform region is a fixed nonuniform region when the region does not abut the lower edge of the previous band image being processed, because a nonuniform region not abutting the lower edge of the current band image will not be consolidated with an image region identified in the subsequently processed band image. If the band image process unit M130 determines that a fixed nonuniform region exists (S1400: YES), in S1500 the attribute determining unit M134 executes a region attribute determination process. This process will be described later. However, if the band image process unit M130 determines that a nonuniform region does not exist (S1400: NO), the band image process unit M130 advances to S1600.

In S1600 the band image process unit M130 saves bottom edge line data LD1 for the bottom edge of the current band image in the adjacent line storage area 243. FIG. 4(E) shows a sample bottom edge line data LD1. The bottom edge line data LD1 is configured of data representing region identifiers for each pixel constituting the bottom raster line of the band image (bottom edge line) for identifying the region to which each pixel belongs. The bottom edge line data LD1 is used in the region consolidation process of S1300.

In S1700 the band image process unit M130 determines whether all band images have been processed. If there remain any band images that have not yet been processed (S1700: NO), the band image process unit M130 returns to S400, acquires band image data representing an unprocessed band image, and repeats the process in S500-S1600 described above. Thus, after completing the above process through S1600 on band image data representing the first band image BDG1 of the original image G (FIG. 3), for example, the same process is repeated for band image data representing the second band image BDG2 of the original image G. The band image data representing the previously processed band image is deleted since this data is overwritten by the newly acquired band image data. After the process has been performed for all band images (S1700: YES), the band image process unit M130 ends the image process.

An example of processing the first band image BDG1 of the original image G was described above. Next, an example of performing the region consolidation process (S1300) and the region attribute determination process (S1500) on the second band image BDG2 of the original image G will be described.

Figures 5C, 5D:
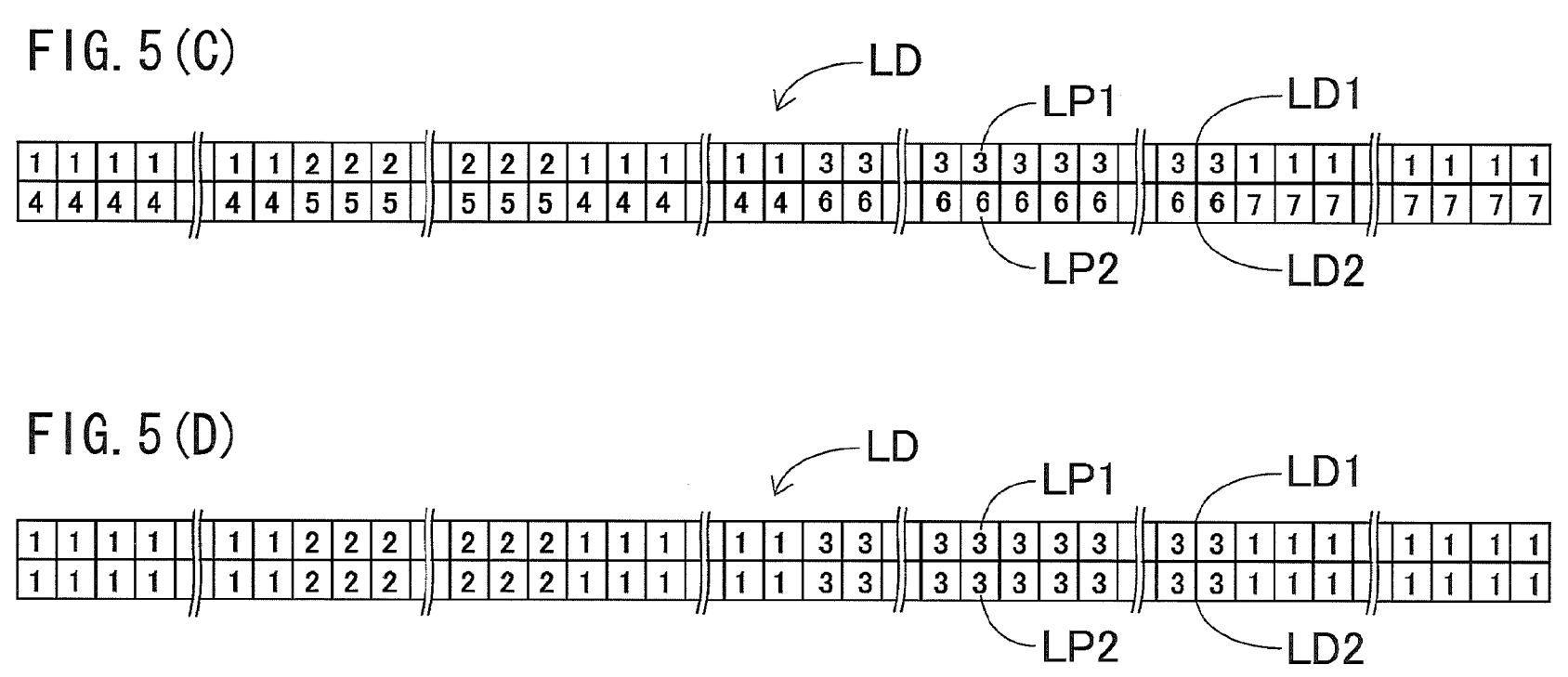

First, the region consolidation process of S1300 will be described. FIGS. 5(A)-5(D) are first explanatory diagrams illustrating the region consolidation process. FIG. 5(A) shows a block image BG2 produced after executing the process in S500-S1100 on the second band image BDG2 of the original image G, i.e., prior to executing the region consolidation process (hereinafter referred to as the "pre-consolidation band image BDG2"). At this stage, image regions BA4-BA8 having pixel values (region identifiers) 4-8, respectively, have been identified in the block image BG2. The image region BA5 corresponds to the lower portion of the first text object Ob2 in the original image G; the image region BA6 corresponds to the lower portion of the photo object PH; and the image region BA8 corresponds to the upper portion of the second text object Ob4. The image regions BA4 and BA7 correspond to the background image Bg1.

FIGS. 6(A)-6(D) are second explanatory diagrams illustrating the region consolidation process. FIG. 6(A) shows the pre-consolidation image analysis data 294. At this stage, image regions identified in the first band image BDG1 having region identifiers 1-3 and image regions identified in the second band image BDG2 having region identifiers 4-8 are treated as separate regions. The characteristic quantities Np, Nt, and HD and the binary image data MG for each region are also treated separately.

Figure 2B:
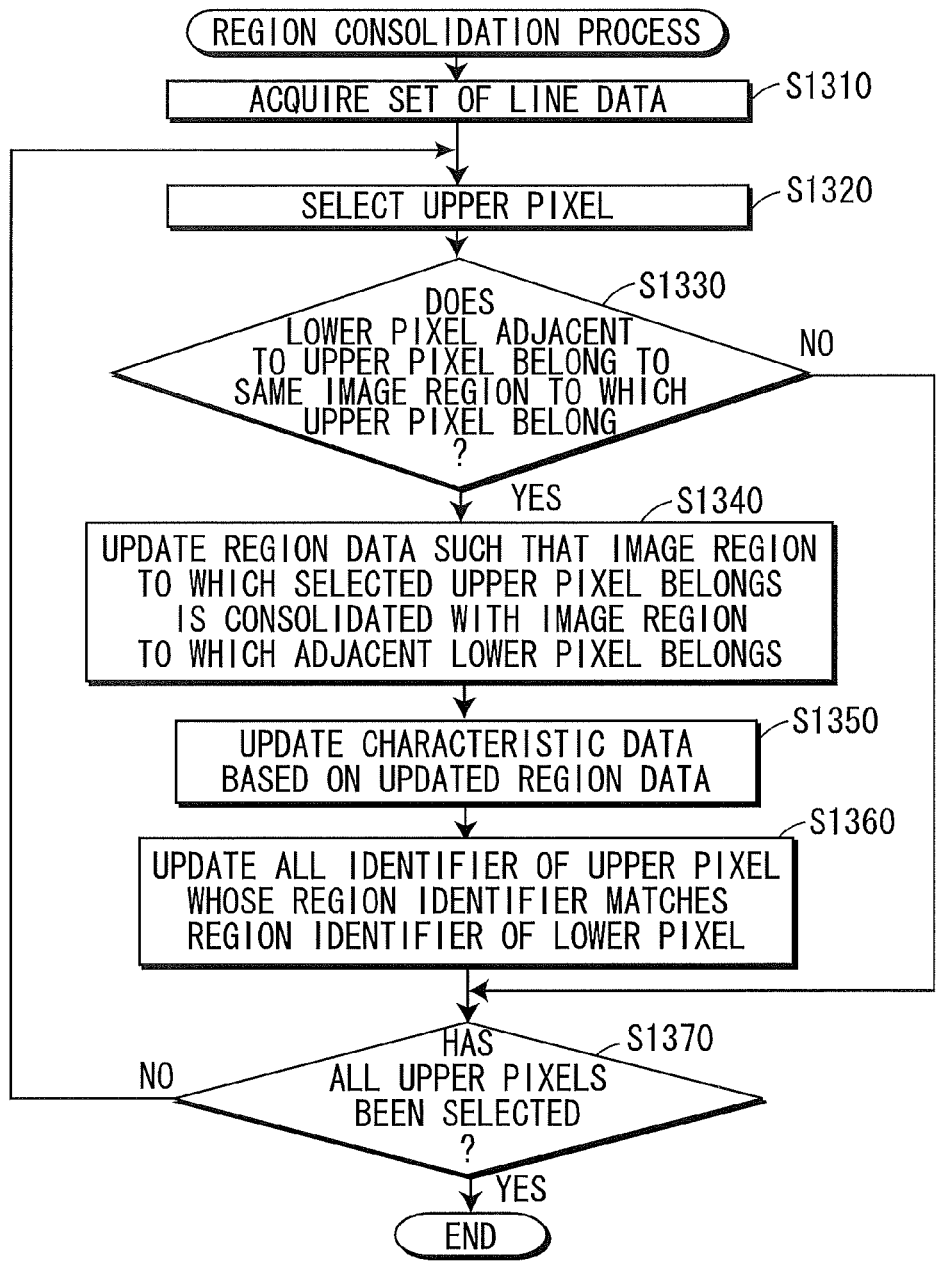
Figure 4:
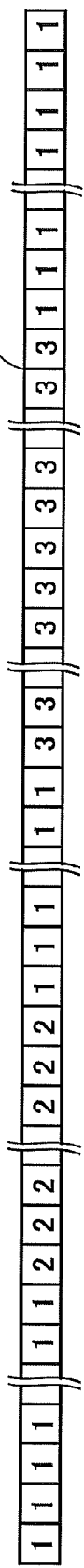
FIG. 4(A) is an explanatory diagram showing a band image included in the original image shown in FIG. 3.
FIG. 4(B) is an explanatory diagram showing an edge image created based on the band image shown in FIG. 4(A)
FIG. 4(C) is an explanatory diagram showing a block image created based on the edge image shown in FIG. 4(B)
FIG. 4(D) is a table showing an example of image analysis data.
FIG. 4(E) is an explanatory diagram showing an example of edge line data.

When making the determination in S1200 after completing S500-S1100 on the second band image BDG2, for example, the band image process unit M130 determines that the band image BDG2 is a second or subsequent band image (S1200: YES) and executes the region consolidation process of S1300. FIG. 2(B) illustrates steps in the region consolidation process. In S1310 of FIG. 2(B), the region data updating unit M132 acquires a set of line data LD. FIG. 5(C) shows an example of a set of line data LD acquired in this step. The set of line data LD is stored in the adjacent line storage area 243 and includes the bottom edge line data LD1 of the previously processed band image, and top edge line data LD2 for the band image currently being processed.

The bottom edge line data LD1 includes data for each pixel constituting the bottommost raster line of the band image (bottom edge line), as described above. Pixel data in the bottom edge line data LD1 is region identifiers identifying the regions to which the pixels belong. The bottom edge line data LD1 is stored in the adjacent line storage area 243 in S1600 when processing the previous band image. The top edge line data LD2 includes data for each pixel constituting the topmost raster line of the current band image (top edge line). Data for each pixel in the top edge line data LD2 is a region identifier identifying the region to which the pixel belongs.

The example in FIG. 5(C) shows the bottom edge line data LD1 for the first band image BDG1 of the original image G, and the top edge line data LD2 for the second band image BDG2 of the original image G. The lower edge line of a band image is an adjacent line neighboring the band image to be processed next, and the upper edge line of a band image is an adjacent line neighboring the previously processed band image. Further, the bottom edge line of a band image and the top edge line of a band image to be processed after the first band image form a set of adjacent raster lines in the original image G, where the bottom edge line is on top and the top edge line on the bottom. Pixel data LP1 constituting the bottom edge line data LD1 will be called the upper pixel data LP1, and pixel data LP2 constituting the raster line corresponding to the top edge line data LD2 will be called the lower pixel data LP2 (see FIG. 5(C)). Further, pixels corresponding to the upper pixel data LP1, i.e., pixels constituting the bottom edge line will be called the upper pixels, and pixels corresponding to the lower pixel data LP2 and constituting the top edge line will be called lower pixels.

In S1320 the region data updating unit M132 sequentially selects upper pixels. The selection order follows a direction along the bottom edge line, form one end to the other.

In 51330 the region data updating unit M132 determines whether the lower pixel adjacent to the upper pixel selected in S1320 belongs to the same image region to which the upper pixel belongs. In other words, the region data updating unit M132 determines whether or not a uniform (nonuniform) sub-region of a band image that has been processed previously abuts a uniform (nonuniform) sub-region of a band image that is being processed currently. The region data updating unit M132 determines the image region to which the upper pixel belongs by referencing the upper pixel data LP1 (region identifier) for the selected upper pixel. The region data updating unit M132 determines the image region to which the lower pixel belongs by referencing the lower pixel data LP2 (region identifier) for the lower pixel adjacent to the selected upper pixel. Here, the "lower pixel adjacent to the upper pixel" may simply refer to the pixel positioned directly beneath the upper pixel or may refer to three lower pixels positioned directly below the upper pixel, diagonally below and left of the upper pixel, and diagonally below and right of the upper pixel. The region data updating unit M132 then references the image analysis data 294 and determines that the lower pixel belongs to the same image region as the upper pixel when the image region to which the upper pixel belongs and the image region to which the lower pixel belongs are either both uniform regions or nonuniform regions.

If the adjacent lower pixel does not belong to the same image region as the upper pixel (S1330: NO), the region data updating unit M132 skips S1340-S1360 and advances to S1370. However, if the adjacent lower pixel belongs to the same image region (S1330: YES), in S1340 the region data updating unit M132 consolidates the image region to which the selected upper pixel belongs with the image region to which the adjacent lower pixel belongs and updates the region data to reflect the consolidated region as a single image region.

More specifically, if an upper pixel belonging to a uniform region is an "upper uniform region pixel" and a lower pixel belonging to a uniform region is a "lower uniform region pixel," then when an upper uniform region pixel is adjacent to a lower uniform region pixel, the region data updating unit M132 consolidates the uniform region to which the upper uniform region pixel belongs with the uniform region to which the lower uniform region pixel belongs. Similarly, if an upper pixel belonging to a nonuniform region is an "upper nonuniform region pixel" and a lower pixel belonging to a nonuniform region is a "lower nonuniform region pixel," when an upper nonuniform region pixel is adjacent to a lower nonuniform region pixel, the region data updating unit M132 consolidates the nonuniform region to which the upper nonuniform region pixel belongs with the nonuniform region to which the lower nonuniform region pixel belongs.

In S1350 the characteristic data updating unit M133 updates the characteristic data (characteristic quantities Np, Nt, and HD and binary image data MG) based on the updated region data. Specifically, the characteristic data updating unit M133 determines, when the region data is updated such that a nonuniform region to which the selected upper pixel belongs and a nonuniform region to which the corresponding lower pixel adjacent to the selected upper pixel belongs are identified as a single nonuniform region, a characteristic value of the single nonuniform region by using two characteristic values of two nonuniform regions. Then, the characteristic data updating unit M133 updates the characteristic data such that the two characteristic values are replaced with the characteristic value of single nonuniform region.

In S1360 the identification data updating unit M1321 updates all identifiers in the set of line data LD matching the region identifier of the lower pixel adjacent to the selected upper pixel to the same value as the region identifier of the selected upper pixel, and subsequently advances to S1370.

In S1370 the band image process unit M130 determines whether all upper pixels have been selected and processed. If there remain any upper pixels that have not been selected (S1370: NO), the band image process unit M130 returns to S1320, selects a previously unselected upper pixel, and repeats the process in S1330-S1370 described above. When all upper pixels have been selected and processed (S1370: YES), the band image process unit M130 ends the region consolidation process.

Here, a specific example for the region consolidation process will be given. FIG. 5(B) shows the block image BG2 after the region consolidation process is executed (hereinafter referred to as the "post-consolidation block image BG2") in which uniform image regions BA4 and BA7 (FIG. 5(A)) have been consolidated with uniform region BA1 of the block image BG1 adjacent on the upper side (FIG. 4(C)). In addition, the nonuniform regions BA5 and BA6 in the block image BG2 (FIG. 5(A)) have been consolidated with the nonuniform regions BA2 and BA3 of the block image BG1 adjacent on the upper side. The region data updating unit M132 consolidates these image regions by updating the image analysis data 294, as shown in FIG. 6(B). That is, data for image regions having identifiers "4-7" is deleted from the image analysis data 294 and integrated with data for image regions having identifiers "1-3", which image regions are the destination of consolidation. For example, data describing block coordinates for image regions having identifiers "4" and "7" prior to consolidation are integrated with data describing block coordinates for image regions having the identifier "1" after consolidation. In addition, the characteristic quantities Np, Nt, and HD of the image region having identifier "3" after consolidation is set to the sum of the characteristic quantities for image regions having identifiers "3" and "6" prior to consolidation. That is, after the regions having identifiers "3" and "6" are consolidated (hereinafter, this consolidated region is denoted by "3+6"), the object pixel count Np(3+6) is obtained by Np(3)+NP(6), the total pixel count Nt(3+6) is obtained by Nt(3)+Nt(6), and the histogram HD(3+6) is obtained by adding numbers of object pixels for each brightness value of the image regions "3" and "6". Similarly, binary image data MG (3+6) for the image region having identifier "3" after consolidation is configured of data integrating the binary image data MG(3) for the image region having identifier "3" prior to consolidation and the binary image data MG(6) for the image region having identifier "6" prior to consolidation.

As described above in the region consolidation process, the region data updating unit M132 sequentially targets each set of adjacent upper and lower pixels along the bottom edge line and top edge line based on the set of line data LD and determines whether the targeted set of pixels is a pair of an upper uniform region pixel and a lower uniform region pixel or a pair of an upper nonuniform region pixel and a lower nonuniform region pixel (S1320 and S1330). When the results of the determination in S1330 are positive, the region data updating unit M132 updates the set of line data LD so that the region identifier of the lower pixel in the targeted pair is set to match the region identifier of the upper pixel (S1340-S1360). When this process is performed on the example given in FIGS. 5(A) and 5(C), the top edge line data LD2 is updated to the exact same values as the bottom edge line data LD1, as shown in FIGS. 5(B) and 5(D).

Figure 7A:
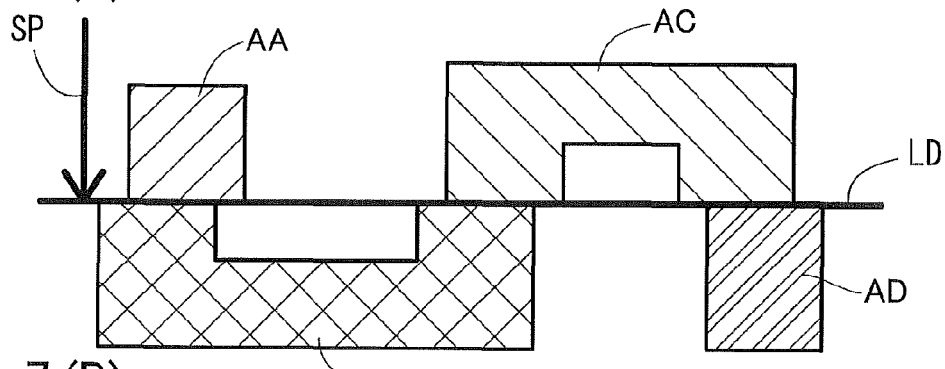
FIG. 7(A)-7(D) are explanatory diagrams illustrating the region consolidation process.
Figure 7B:
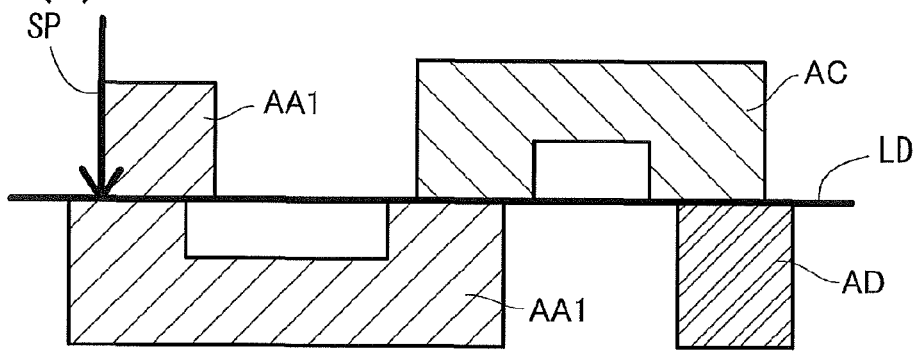
Figure 7C:
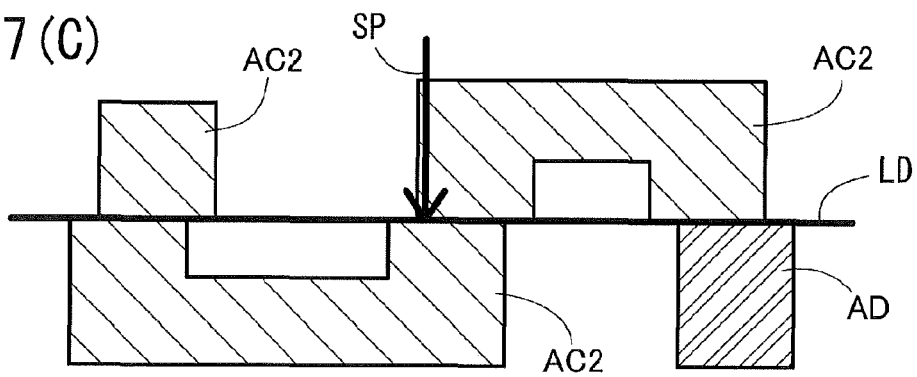
Figure 7D:
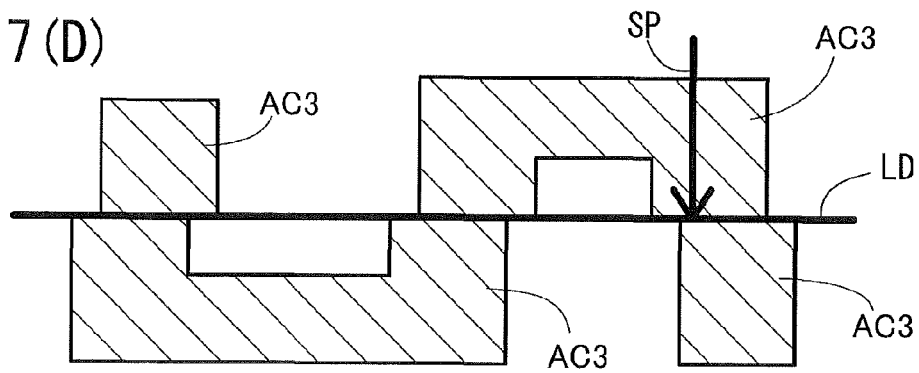

By scanning from one end of the set of line data LD to the other in this way, the multifunction peripheral 200 can suitably determine whether to consolidate adjacent image regions. The region consolidation process will be described in greater detail with reference to FIGS. 7(A)-7(D). FIGS. 7(A)-7(D) are third explanatory diagrams illustrating the region consolidation process. As shown in FIG. 7(A), prior to consolidation, discrete nonuniform regions AA and AC are identified in the band image above the set of line data LD (the upper band image) and discrete nonuniform regions AB and AD are identified in the band image below the set of line data LD (the lower band image). The single nonuniform region AC in the upper band image is adjacent to the two nonuniform regions AB and AD in the lower band image. Similarly, the single nonuniform region AB in the lower band image is adjacent to both nonuniform regions AA and AC in the upper band image.

The arrow SP in FIGS. 7(A)-7(D) indicates the scanning position in the set of line data LD (the position of the pair of upper and lower pixels currently being processed). At the scanning position shown in FIG. 7(B), the nonuniform region AA in the upper band image and the nonuniform region AB in the lower band image are consolidated and identified as a new nonuniform region AA1. The region identifier is identical to that for the nonuniform region AA prior to consolidation. At the scanning position shown in FIG. 7(C), the nonuniform region AC in the upper band region and the nonuniform region AA1 are consolidated and are identified as a new nonuniform region AC2. The region identifier is identical to that for the nonuniform region AC prior to consolidation. At the scanning position shown in FIG. 7(D), the nonuniform region AC2 and the nonuniform region AD in the lower hand image are consolidated and identified as a new nonuniform region AC3. The region identifier is identical to that of the nonuniform region AC prior to consolidation.

As is clear from the above example, when a single image region in the upper band image abuts a plurality of image regions of the same type in the lower band image, it is possible to identify the plurality of separate image regions in the lower band image as a single image region by scanning the set of line data LD from one end to the other. Conversely, when a single image region in the lower band image is adjacent to a plurality of image regions of the same type in the upper band image, it is possible to identify the plurality of separate image regions in the upper band image as a single image region. As a result of this process, image regions of various shapes spanning a plurality of band images, such as U-shaped image regions, inverted U-shaped image regions, and O-shaped image regions, can be suitably consolidated and identified as a single image region.

Next, the region attribute determination process of S1500 (FIG. 2(A)) will be described. After completing the process in S400-S1300 on the second band image BDG2 of the original image G (FIG. 3), in S1400 the band image process unit M130 determines that the image region BA2 having region identifier "2" in the block image BG2 (FIG. 5(B)) is a fixed image region (S1400: YES). As a result, the nonuniform image region A2 (FIG. 3) in the original image G that includes the first text object Ob2 is fixed.

Upon reaching this YES determination in S1400, in S1500 the attribute determining unit M134 executes the region attribute determination process on the fixed nonuniform image region A2 to determine the attribute of the same.

The region attribute determination process will be described referring to FIGS. 8(A) and 8(B). The attribute determining unit M134 determines the attribute of the target region (the image region A2 in this example) based on the pixel density D, distribution width W, and color number S. First, the attribute determining unit M134 calculates the pixel density D based on the object pixel count Np and total pixel count Nt recorded in the image analysis data 294 as characteristic quantities of the target region. The pixel density D indicates the percentage of object pixels occupying the target region and is expressed by the equation D=Np/Nt.

Next, the attribute determining unit M134 calculates the distribution width W and color number S based on the histogram data HD recorded in the image analysis data 294 as a characteristic quantity of the target region. The histogram data HD indicates the pixel count for each available brightness value. FIG. 8(A) shows a histogram produced by plotting pixel counts on the vertical axis for each of the brightness values on the horizontal axis based on the histogram data HD.

The distribution width W may be, for example, the difference between the minimum value and maximum value of brightness values for which the pixel count exceeds a threshold Th2, as shown in the histogram of FIG. 8(A). The distribution width W is a characteristic value representing a characteristic of the brightness distribution and indicates the width of the distributed range of brightness values.

As shown in FIG. 8(A), the color number S in this embodiment is the number of brightness values for which the pixel count exceeds the threshold Th2. Since the color of these pixels differs for different brightness values, the number of different brightness values represents the number of colors (the number of types of colors). Hence, the color number S is a characteristic value indicating the number of different brightness values.

The attribute determining unit M134 determines the attribute of the target region based on the pixel density D, distribution width W, and color number S described above. For example, the attribute determining unit M134 determines whether each of the pixel density D, distribution width W, and color number S are greater than or equal to corresponding references Dth, Wth, and Sth. Using these determination results, the attribute determining unit M134 references the determination table 292 shown in FIG. 8(B) to determine the attribute of the target region. In the embodiment, the attribute determining unit M134 determines whether the attribute of the target region (a nonuniform region) is "photo," "text," or "drawing." Here, "drawing" includes an illustration, table, diagram, pattern, and the like.

As described above, the peripheral 200 of the embodiment determines whether a fixed nonuniform region exists in a band image each time a unit band image is processed (S400-S1600 of FIG. 2(A)) and, when a fixed nonuniform region exists (S1400: YES), executes the region attribute determination process of S1500. In other words, the attribute determination process of S1500 is executed in the embodiment each time a nonuniform region is found to be finalized when processing a unit band image.

Figure 9:
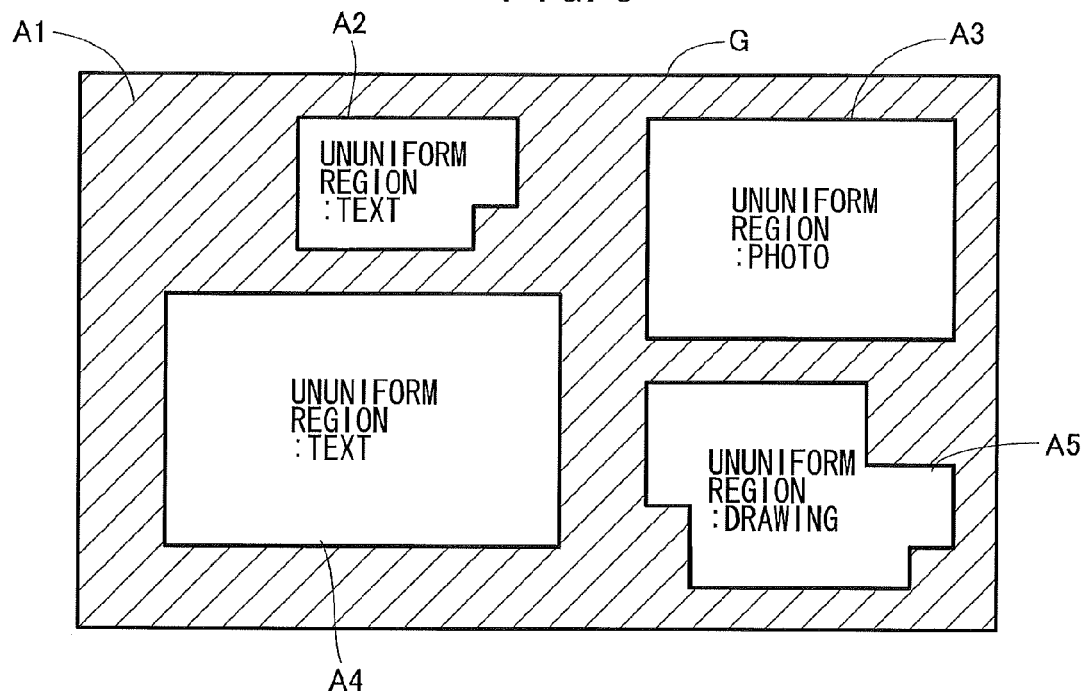
FIG. 9 is an explanatory diagram illustrating an example of results of the image process.

FIG. 9 conceptually illustrates the results of the image process described above. After the image process is completed for the entire original image G, i.e., after the image process is performed for all four band images BDG1-BDG4 (FIG. 3), the content shown in FIG. 9 is recorded in the image analysis data 294. In this example, the uniform image region A1 and nonuniform image regions A2-A5 are conclusively identified in the original image G. The multifunction peripheral 200 determines that the attributes of the image regions A2 and A4 are "text," the attribute of the image region A3 is "photo," and the attribute of the image region A5 is "drawing." After the image process is completed, the image process unit M100 may execute an image correction process on each region of the image whose attribute has been identified based on the identified attribute.

Since the image process according to the above-described embodiment is performed on units of band images BDG1-BDG4 produced by dividing the original image G, the required capacity of the internal storage device 240 can be reduced. The multifunction peripheral 200 also updates region data in the image analysis data 294 to identify a plurality of image regions as a single region when the plurality of image regions are adjacent uniform regions and adjacent nonuniform regions. As a result, the multifunction peripheral 200 can ultimately identify image regions with accuracy, despite processing the target region in units of band images.

In the image process of the above-described embodiment, the multifunction peripheral 200 calculates the object pixel count Np, total pixel count Nt, and histogram data HD as characteristic quantities of nonuniform regions identified while processing a band image. When consolidating a plurality of nonuniform regions spanning a plurality of band images, the multifunction peripheral 200 integrates the characteristic quantities Np, Nt, and HD, thereby reducing the amount of information that must be saved.

Figure 10:
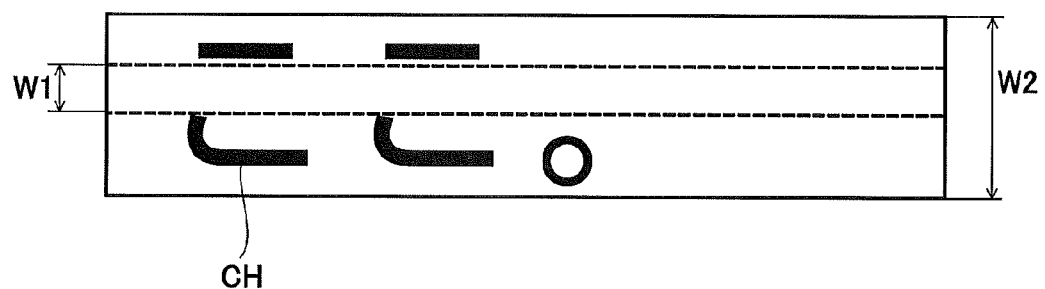
FIG. 10 is an explanatory diagrams illustrating a relationship between a band width and a size of character included in image.

As shown in FIG. 10, a single character CH may include a plurality of components separated vertically. Images having objects, such as this type of character CH, are more susceptible to problems when the band width of band images is set excessively small in relation to the size of the character CH, as is indicated by the band width W1 shown in FIG. 10. In other words, when the band width is excessively small, the size of the unit blocks B configured for the band images is inevitably smaller, giving rise to situations in which gaps formed between the plurality of components of the character CH separated vertically are determined to be uniform regions. Consequently, image regions corresponding to the text object, which should be identified as a single image region, is highly likely to be identified as two separate image regions. In the image process of the above-described embodiment, the multifunction peripheral 200 sets the band width of band images based on the character size CS, thereby determining a suitable band width (a band width W2 in the example of FIG. 10) for the size of the text object. This method can reduce the likelihood of image regions corresponding to a text object that should be identified as a single image region being identified as two separate image regions.

Further, when a single image region in an upper band image abuts a plurality of image regions of the same type in the lower band image, as described with reference to FIGS. 7(A)-7(E), the image process of the above-described embodiment can identify the plurality of separated image regions in the lower band image as a single image region. Conversely, when a single image region in the lower band image abuts a plurality of image regions of the same type in the upper band image, the image process of the above-described embodiment can identify the plurality of separated image regions in the upper band image as a single image region. Accordingly, the multifunction peripheral 200 of the above-described embodiment can ultimately identify image regions of various shapes that span a plurality of band images as a single image region with accuracy and can reduce the quantity of data stored in the image analysis data 294 (region data).

In the region consolidation process, the multifunction peripheral 200 determines abutting relationships between regions in one band image and regions in another band image. Consequently, the multifunction peripheral 200 can determine with accuracy whether to consolidate regions in the first band image with regions in the second band image.

More specifically, when a uniform region pixel in the bottom edge line data LD1 abuts a uniform region pixel in the top edge line data LD2, the multifunction peripheral 200 determines that the uniform regions to which the uniform region pixels belong should be consolidated. Similarly, when a nonuniform region pixel in the bottom edge line data LD1 abuts a nonuniform region pixel in the top edge line data LD2, the multifunction peripheral 200 determines that the nonuniform regions to which these nonuniform region pixels belong should be consolidated. Accordingly, the multifunction peripheral 200 can combine uniform regions that the multifunction peripheral 200 determines should be consolidated based on the abutting relationships between pixels in the bottom edge line data LD1 and pixels in the top edge line data LD2 and can accurately determine groups of nonuniform regions that should be consolidated.

In the above-described embodiment, the multifunction peripheral 200 also determines if a set of process targets has the abutting relationship described above, the process targets being set sequentially to pairs of adjacent upper and lower pixels in the set of line data LD. When the pair of process targets have the abutting relationship described above, the multifunction peripheral 200 updates the set of line data LD so that the region identifiers assigned to the upper and lower pixels in the pair of process targets identify the same region. Since the multifunction peripheral 200 updates the set of line data LD while determining regions to be consolidated in this way, the multifunction peripheral 200 can accurately set groups of uniform regions to be consolidated and groups of nonuniform regions to be consolidated. Further, since the set of line data LD includes two raster lines, the buffer region 241 need not take up an excessive amount of memory. Further, at this time, the multifunction peripheral 200 can update each block pixel constituting image regions in the band image that are assigned the same region identifiers in the upper and lower pixels in order that the region identifiers identify the same region.

When a fixed nonuniform region is detected while processing a unit band image, the multifunction peripheral 200 determines the attribute of this fixed nonuniform region using characteristic data in the image analysis data 294 (the characteristic quantities Np, Nt, and HD). Hence, by determining the attribute of these nonuniform regions, each time a nonuniform region is fixed, the characteristic data is no longer needed and need not be saved, thereby reducing the required capacity of the buffer region 241.

While the invention has been described in detail with reference to the embodiment thereof, it would be apparent to those skilled in the art that various changes and modifications may be made therein without departing from the spirit of the invention.

(1) In the above-described embodiment, when a nonuniform region pixel in the bottom edge line data LD1 is adjacent to a nonuniform region pixel in the top edge line data LD2, the image processor consolidates the nonuniform regions to which these pixels belong. However, when an object pixel in the bottom edge line data LD1 for a nonuniform region is adjacent to an object pixel in the top edge line data LD2 for a nonuniform region, the image processor may determine to consolidate the nonuniform regions to which these object pixels belong.

Figure 11:
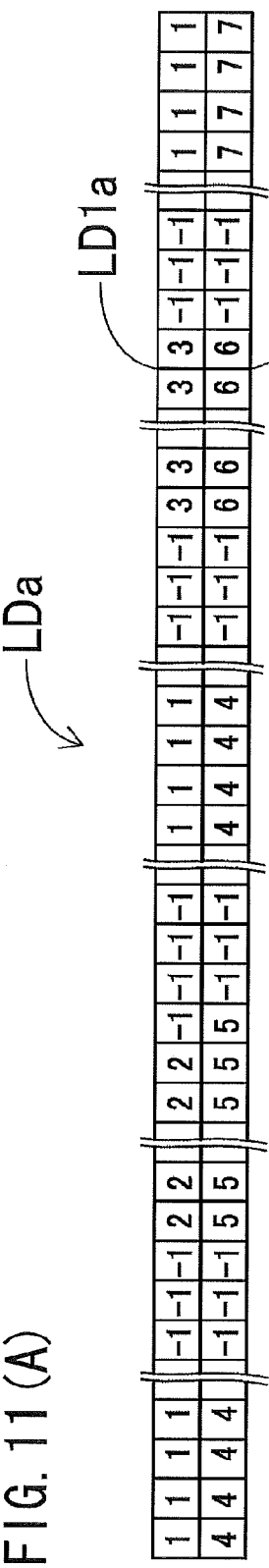
FIG. 11(A) is an explanatory diagram showing an example of a set of line data prior to the region consolidation process in a variation of the embodiment.
FIG. 11(B) is an explanatory diagram showing a set of line data to which the set of line data of FIG. 11(A) is updated after the region consolidation process is executed.
Figure 11:
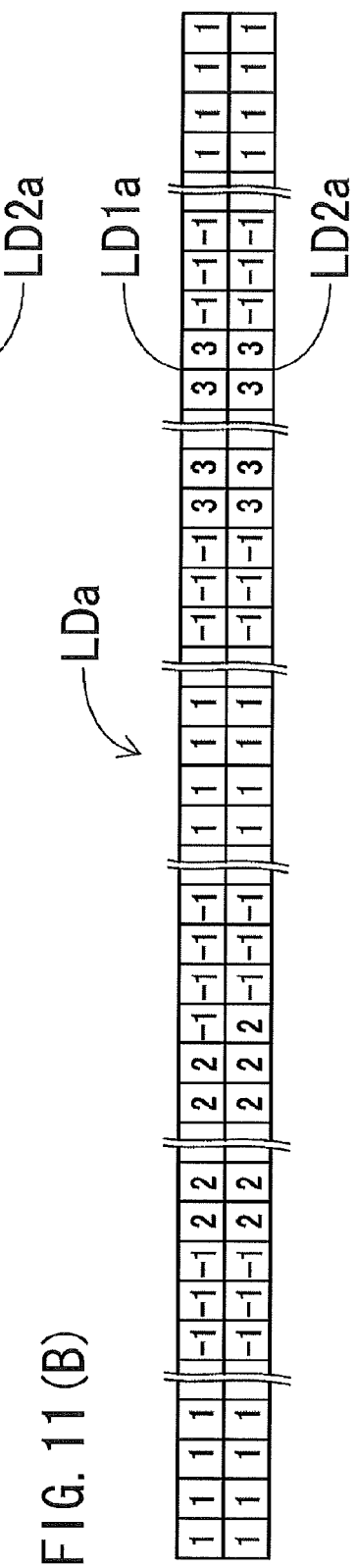

FIG. 11 shows a set of line data LDa according to a variation of the embodiment. A bottom edge line data LD1a in the present variation has region identifiers as the values of pixels belonging to uniform regions, which region identifiers identify the uniform regions to which the pixels belong. The bottom edge line data LD1a also has region identifiers as values of pixels belonging to nonuniform regions for identifying the nonuniform regions to which the pixels belong when the pixels are object pixels, and have the pixel value "−1" when the pixels are background pixels. A top edge line data LD2a of the set of line data LDa is similar.

In this variation, pairs of upper and lower pixels are compared from one end of the set of line data LDa to the other, as described in the embodiment. When an object pixel of a nonuniform region in one band image is adjacent to an object pixel of a nonuniform region in the other band image, the image processor determines to consolidate the nonuniform regions to which these object pixels belong. Since the image processor determines to consolidate adjacent nonuniform regions under the condition that there exist continuous object pixels across the regions, the image processor can identify different image regions for each object configured of continuous object pixels.

In this way, the reference for determining whether to consolidate nonuniform regions may differ from the reference to determine whether to consolidate uniform regions. Further, the reference for determining whether to consolidate uniform regions is not restricted to consolidation of all regions that are simply adjacent to each other, but may be the consolidation of adjacent uniform regions having the same color. In general, the image processor may determine to consolidate a first uniform region in a first band image with a second uniform region in a second band image if the first and second uniform regions have a first adjacent relationship, and may determine to consolidate a first nonuniform region of a first band image with a second nonuniform region of a second band image when the first and second nonuniform regions have a second adjacent relationship.

(2) In the above-described embodiment, the band width BW is determined using the resolution R and character size CS. However, the band width BW may be set based on the size of other types of objects, such as drawing objects or photo objects. This can allow the band width BW to be set for suitably identifying image regions corresponding to drawing objects or photo objects. Alternatively, the band width BW may be set based on the size of the original image (for example, the number of pixels both vertically and horizontally). The size of the original image can be used to broadly predict the size of text objects being used, for example. Generally, it is preferable to set the band width BW based on size data related to each one of the original image, the objects represented in the original image, and the pixels constituting the original image.

(3) Although the band width BW set based on the resolution R and character size CS is used unchanged in the embodiment, the band width may be modified based on the capacity of the buffer region 241. For example, if band images at the band width BW cannot be acquired due to a low capacity in the buffer region 241, the image processor may acquire band images of a band width smaller than the band width BW, such as the maximum band width that can be acquired according to the capacity of the buffer region 241.

(4) The image processor according to the embodiment identifies image regions in the original image G and identifies the attributes of conclusively identified image regions (attribute determination process). However, the attribute determination process may be omitted, and the image processor may simply identify the image regions. In this case, the calculations of characteristic quantities need not be performed.

(5) In the above-described embodiment, the image processor uses the set of line data LD to determine whether to couple regions spanning a plurality of band images, but the image processor may use an adjacent relationship of block pixels BP for determining whether to couple such regions. More specifically, the image processor may compare block pixels BP positioned on the lower edge of one band image with block pixels BP positioned in the upper edge of another band image adjacent to the first band image from below, and may determine to consolidate the regions in which the adjacent block pixels BP belong when the adjacent block pixels BP belong to the same type of region (nonuniform or uniform region).

(6) When a first region in a first band image is adjacent to a plurality of regions in a second band image in the above-described embodiment, the image processor updates the region data so that the plurality of regions in the second band image are identified as a single region. However, the image processor may instead consolidate one region in the first band image with one region in the second band image and identify the plurality of regions in the second band image as separate regions.

(7) When updating image data in the preferred embodiment in order to consolidate a plurality of regions spanning a plurality of band images, the image processor updates the region identifiers in the set of line data LD. However, the image processor may simply use the region identifiers in the set of line data LD to determine whether to consolidate a plurality of regions without updating the identifiers.

(8) In the above-described embodiment, the image processor calculates the edge strength of image regions in an original image (band image) and sets image regions having an edge strength greater than or equal to a reference as nonuniform regions and image regions having an edge strength less than the reference as uniform regions. However, the image processor may calculate an evaluation value other than edge strength that can assess the uniformity of an image region and may compare this evaluation value to a reference. Based on the results of this comparison, the image processor may set image regions found to be more uniform than the prescribed reference to uniform regions and image regions found to be less uniform as nonuniform regions. In general, the smaller the difference between each color component (RGB values, for example) of pixels constituting the image region, the greater likelihood the image region is a uniform region.

(9) The device used to implement the functions of the image process unit M100 is not limited to the multifunction peripheral 200 in the embodiment and may be configured of another type of device, such as a computer built into a printer, digital camera, scanner, or other image-related device; or a common personal computer, server, or other computing device. Further, rather than using a single unit device, the functions of the image process unit M100 may be implemented on a computing system having a plurality of computing devices in separate housings (for example, a distributed computing system for implementing cloud computing). In this case, the entire computing system that implements the functions of the image process unit M100 corresponds to the image processor of the present invention.

(9) Part of the processes implemented in hardware in the embodiment may be replaced with software processes, while conversely part of the processes implemented in software may be replaced with a hardware configuration.

What is claimed is:
1. An image processing device comprising:
a processor; and
a memory storing computer readable instructions therein, the computer-readable instructions, when executed by the processor, causing the image processing device to perform:
    preparing image data representing an image including a plurality of regions;
    dividing the image into a plurality of band images each including at least one sub-region, the plurality of band images including a first band image and a second band image adjacent to the first band image;
    classifying each of the at least one sub-region included in the band image as one of an uniform sub-region and a nonuniform sub-region other than the uniform sub-region;
    creating region data used to identify each of the at least one sub-region included in the band image;
    updating the region data such that the region data identifies both a first uniform sub-region and a second uniform sub-region as a single uniform region of the image when the first uniform sub-region abuts the second uniform sub-region, the first uniform sub-region being included in the first band image and classified as the uniform sub-region, the second uniform sub-region being included in the second band image and classified as the uniform sub-region; and
    updating the region data such that the region data identifies both a first nonuniform sub-region and a second nonuniform sub-region as a single nonuniform region of the image when the first nonuniform sub-region abuts the second nonuniform sub-region, the first nonuniform sub-region being included in the first band image and classified as the nonuniform sub-region, the second nonuniform sub-region being included in the second band image and classified as the nonuniform sub-region.

2. The image processing device according to claim 1, wherein the computer-readable instructions, when executed by the processor, cause the image processing device to perform:
    selecting one of the plurality of band images sequentially, the second band image being selected immediately after the first band image is selected;
    classifying each of the at least one sub-region included in the selected band image as one of an uniform sub-region and a nonuniform sub-region other than the uniform sub-region;
    creating region data used to identify each of the at least one sub-region included in the selected band image;

updating the region data such that the region data identifies both the first uniform sub-region and the second uniform sub-region as the single uniform region of the image when the second band image is selected; and updating the region data such that the region data identifies both the first nonuniform sub-region and the second nonuniform sub-region as the single nonuniform region of the image when the second band image is selected.

3. The image processing device according to claim 1, wherein the computer-readable instructions, when executed by the processor, cause the image processing device to perform:

determining characteristic data including a characteristic value related to pixels that are included in the at least one sub-region of the band image when the at least one sub-region is classified as the nonuniform sub-region;

determining a characteristic value of the single nonuniform region by using a characteristic value of the first nonuniform sub-region and a characteristic value of the second nonuniform sub-region when the region data is updated such that the region data identifies both the first nonuniform sub-region and the second nonuniform sub-region as the single nonuniform region; and updating the characteristic data such that both the characteristic value of the first nonuniform sub-region and the second nonuniform sub-region are replaced with the characteristic value of the single nonuniform region.

4. The image processing device according to claim 3, wherein the computer-readable instructions, when executed by the processor, cause the image processing device to perform determining an attribute of the second nonuniform sub-region by using the characteristic data when the second nonuniform sub-region is fixed and will no longer be updated.

5. The image processing device according to claim 1, wherein the computer-readable instructions, when executed by the processor, cause the image processing device to perform:

acquiring size data related to at least one of the image, an object represented in the image, and pixels constituting the image;

setting a band width based on the size data; and dividing the image into the plurality of band images each having the band width.

6. The image processing device according to claim 1, wherein the computer-readable instructions, when executed by the processor, cause the image processing device to perform updating, when the first nonuniform sub-region abuts a plurality of second nonuniform sub-regions included in the second band image, the region data such that the region data identifies all of the first nonuniform sub-region and the plurality of second nonuniform sub-regions as the single nonuniform region.

7. The image processing device according to claim 1, wherein the computer-readable instructions, when executed by the processor, cause the image processing device to perform updating, when the second nonuniform sub-region abuts a plurality of first nonuniform sub-regions included in the first band image, the region data such that the region data identifies all of the second nonuniform sub-region and the plurality of first nonuniform sub-regions as the single nonuniform region.

8. The image processing device according to claim 1, wherein the first band image includes a first line image abutting the second band image, the second band image including a second line image abutting the first band image;

wherein the computer-readable instructions, when executed by the processor, cause the image processing device to perform:

judging whether or not the first uniform sub-region abuts the second uniform sub-region based on the first line image and the second line image; and judging whether or not the first nonuniform sub-region abuts the second nonuniform sub-region based on the first line image and the second line image.

9. The image processing device according to claim 8, wherein the first line image includes a plurality of first pixels arranged in a first row, the second line image including a plurality of second pixels arranged in a second row parallel to the first row, each of the plurality of first pixels being classified as one of a first uniform pixel that is included in the first uniform sub-region and a first nonuniform pixel that is included in the first nonuniform sub-region, each of the plurality of second pixels being classified as one of a second uniform pixel that is included in the second uniform sub-region and a second nonuniform pixel that is included in the second nonuniform sub-region, each of the plurality of second pixels abutting one of the plurality of first pixels;

wherein the computer-readable instructions, when executed by the processor, cause the image processing device to perform:

judging that the first uniform sub-region abuts the second uniform sub-region when at least one first pixel classified as the first uniform pixel abuts at least one second pixel classified as the second uniform pixel; and judging that the first nonuniform sub-region abuts the second nonuniform sub-region when at least one first pixel classified as the first nonuniform pixel abuts at least one second pixel classified as the second nonuniform pixel.

10. The image processing device according to claim 9, wherein the computer-readable instructions, when executed by the processor, cause the image processing device to perform:

storing first identification data and second identification data in the memory, the first identification data indicating that the plurality of first pixels are assigned with a first identifier, the second identification data indicating that the plurality of second pixels are assigned with a second identifier;

updating the first identification data and the second identification data such that both the first identifier and second identifier identify the single uniform region when a set of the first pixel and the second pixel abutting the first pixel is a first set of the first uniform pixel and the second uniform pixel;

updating the first identification data and the second identification data such that both the first identifier and the second identifier identify the single nonuniform region when the set of the first pixel and the second pixel abutting the first pixel is a second set of the first nonuniform pixel and the second nonuniform pixel; and updating the region data when the first identification data and the second identification data is updated.

11. A non-transitory computer-readable storage medium storing computer-readable instructions that, when executed by a processor, cause an image processing device to perform:

preparing image data representing an image including a plurality of regions;

dividing the image into a plurality of band images each including at least one sub-region, the plurality of band images including a first band image and a second band image adjacent to the first band image;

classifying each of the at least one sub-region included in the band image as one of an uniform sub-region and a nonuniform sub-region other than the uniform sub-region;

creating region data used to identify each of the at least one sub-region included in the band image;

updating the region data such that the region data identifies both a first uniform sub-region and a second uniform sub-region as a single uniform region of the image when the first uniform sub-region abuts the second uniform sub-region, the first uniform sub-region being included in the first band image and classified as the uniform sub-region, the second uniform sub-region being included in the second band image and classified as the uniform sub-region; and updating the region data such that the region data identifies both a first nonuniform sub-region and a second nonuniform sub-region as a single nonuniform region of the image when the first nonuniform sub-region abuts the second nonuniform sub-region, the first nonuniform sub-region being included in the first band image and classified as the nonuniform sub-region, the second nonuniform sub-region being included in the second band image and classified as the nonuniform sub-region.

12. A method for controlling an image processing device, the method comprising:

preparing image data representing an image including a plurality of regions;

dividing the image into a plurality of band images each including at least one sub-region, the plurality of band images including a first band image and a second band image adjacent to the first band image;

classifying each of the at least one sub-region included in the band image as one of an uniform sub-region and a nonuniform sub-region other than the uniform sub-region;

creating region data used to identify each of the at least one sub-region included in the band image;

updating the region data such that the region data identifies both a first uniform sub-region and a second uniform sub-region as a single uniform region of the image when the first uniform sub-region abuts the second uniform sub-region, the first uniform sub-region being included in the first band image and classified as the uniform sub-region, the second uniform sub-region being included in the second band image and classified as the uniform sub-region; and updating the region data such that the region data identifies both a first nonuniform sub-region and a second nonuniform sub-region as a single nonuniform region of the image when the first nonuniform sub-region abuts the second nonuniform sub-region, the first nonuniform sub-region being included in the first band image and classified as the nonuniform sub-region, the second nonuniform sub-region being included in the second band image and classified as the nonuniform sub-region.

* * * * *